April 10, 1956     A. A. WELBORN ET AL     2,741,451
FLUID FLOW CONTROL DEVICES
Filed March 4, 1952     3 Sheets-Sheet 1
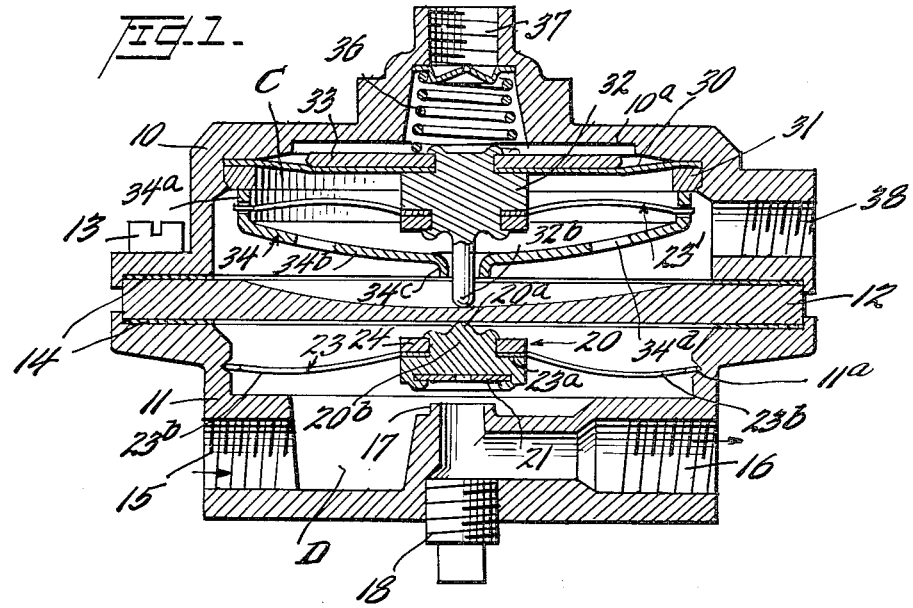
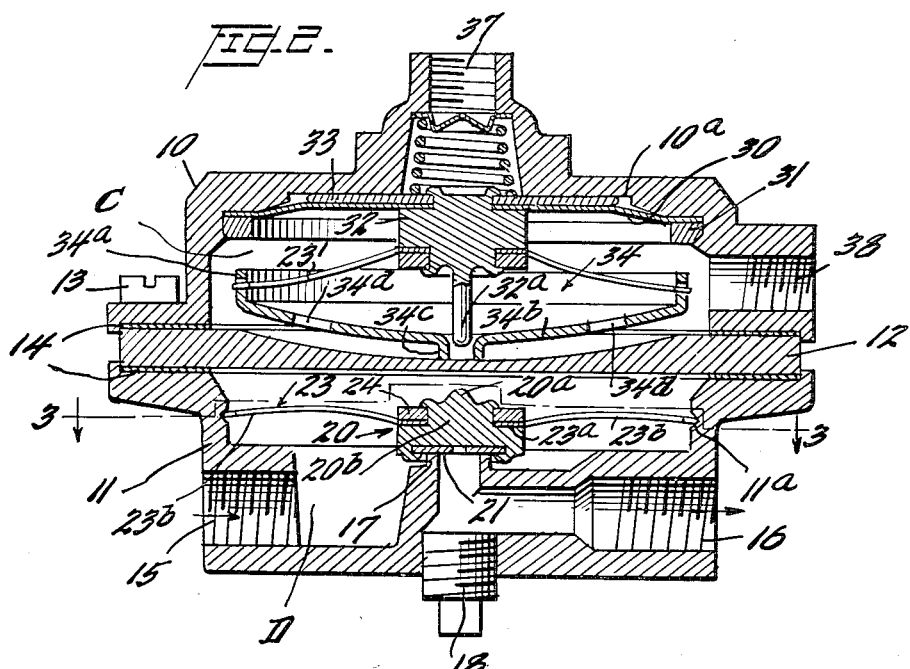
INVENTOR
Arthur A. Welborn
Robert L. Trenthart
BY Watson, Cole, Grindle & Watson
ATTORNEYS

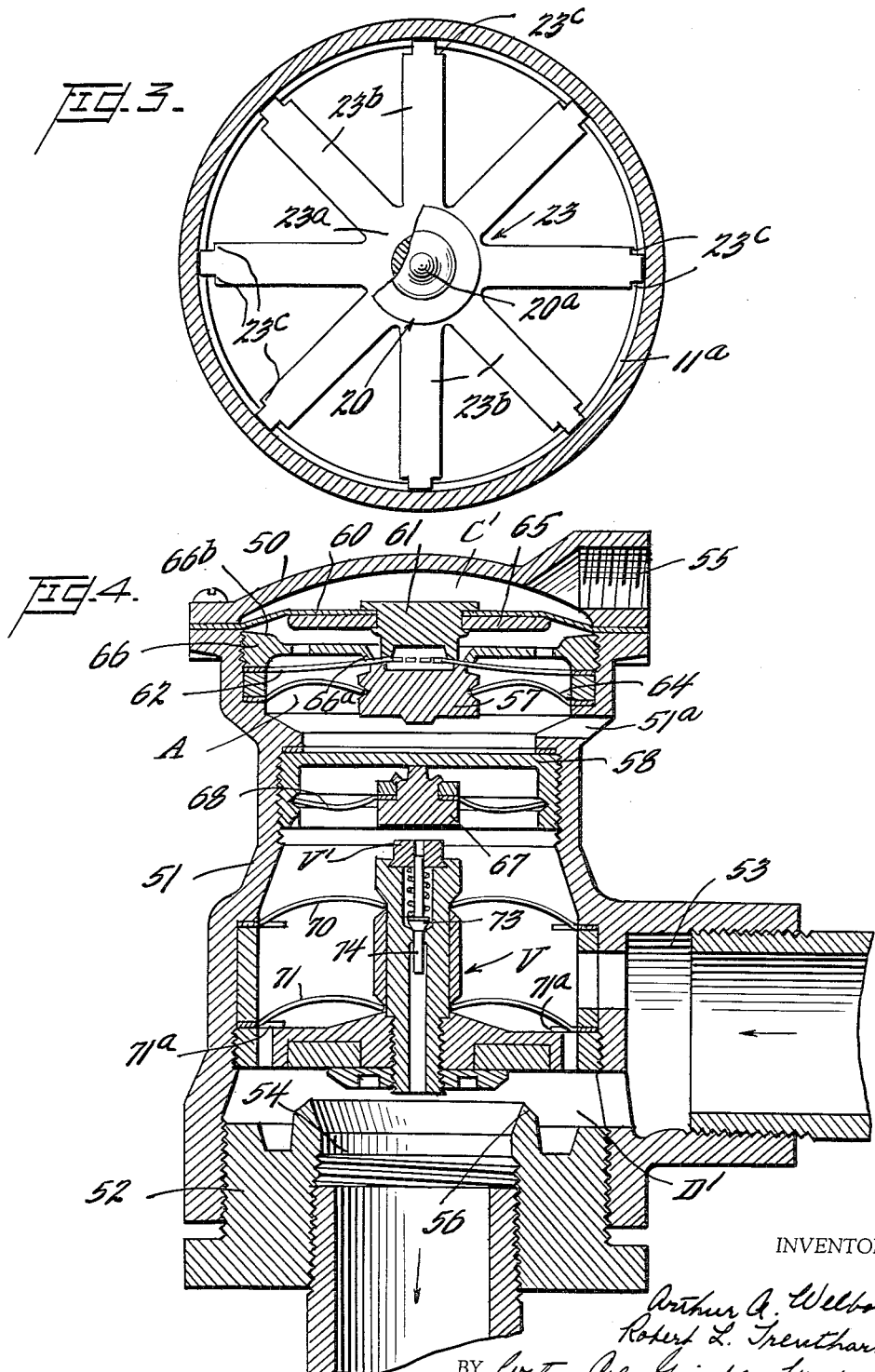

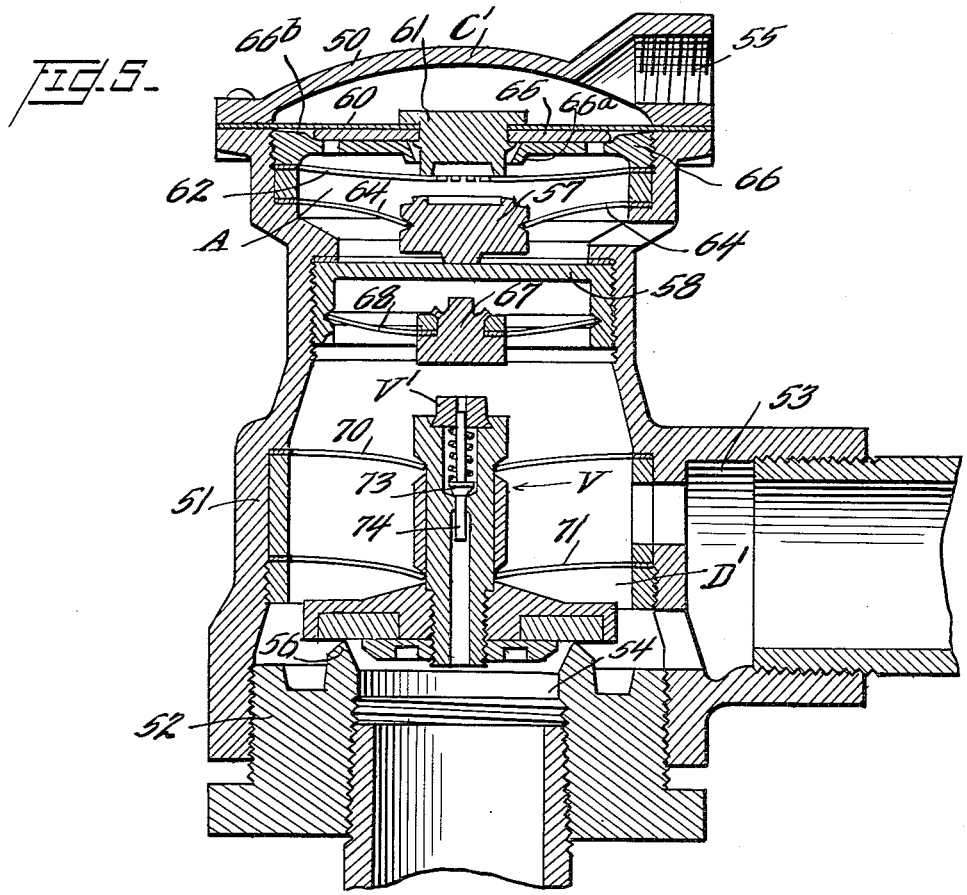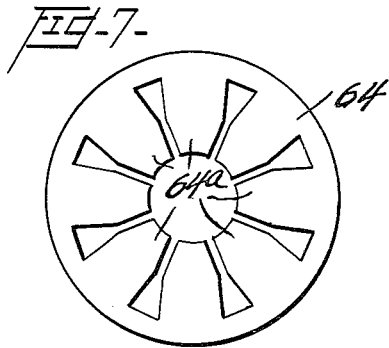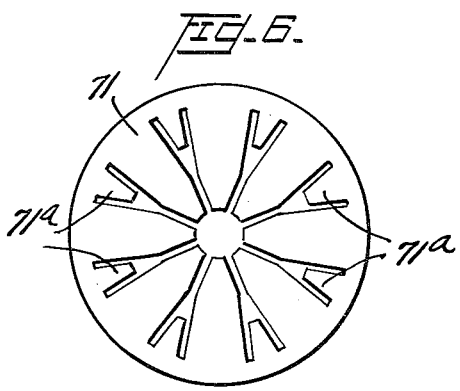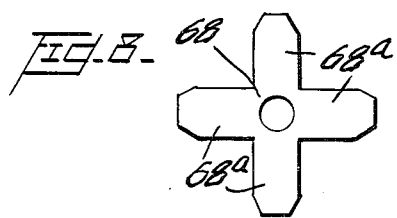

United States Patent Office 2,741,451
Patented Apr. 10, 1956

2,741,451
FLUID FLOW CONTROL DEVICES

Arthur A. Welborn, Rogers, and Robert L. Treuthart, Garfield, Ark.

Application March 4, 1952, Serial No. 274,736

24 Claims. (Cl. 251—76)

This invention relates to fluid flow control devices and particularly to mechanisms for wholly or partially interrupting the flow of fluid through a duct or passage whenever a dangerous condition of fluid pressure builds up in that duct or in any other body of fluid contained in a closed system adjacent the duct.

It is frequently found desirable in handling flowing fluids to utilize an instrumentality which will instantly and automatically interrupt fluid flow through a conduit when a dangerous or otherwise undesirable condition tends to develop, and without employing the conventional type of valve mechanism which requires the use of a valve operating member which passes through the wall of the fluid conduit. It is proposed that this general objective may be realized by inserting within the fluid conduit a valve or closure member which may be caused to function to interrupt flow through that conduit as the result of momentum transfer when the conduit wall is struck a sharp blow from the outside.

The purpose of the present invention is to provide a device of this character which is altogether reliable in operation, compact and durable in construction, and simple in function. Two mechanisms embodying the invention are illustrated in the accompanying drawings. It will be understood that the form and arrangement of the several component elements of the devices illustrated may be modified considerably without causing them to depart in function or result from the inventive concept and that, therefore, the structures shown are by way of example only.

In the drawings:

Figure 1 is an axial section through the entire device, including the valve and the striking means, the valve being illustrated in its unseated position and the striking means in position to deliver a blow;

Figure 2 is a similar view showing, however, the valve seated and the elements of the striking mechanism in the positions which they occupy after this mechanism has functioned to strike the blow which has resulted in valve closure;

Figure 3 is a cross sectional view on the line 3—3 of Figure 2;

Figure 4 is an axial section through a modified form of the invention, showing the duct closing valve in unseated position;

Figure 5 is a similar view, showing this valve seated; and

Figures 6, 7 and 8 are plan views of several forms of snap-over spring members employed in this form of the invention.

The upper and lower casing parts 10 and 11 of the form of the invention illustrated in Figures 1, 2 and 3, together with the intermediate partition or fluid-tight and relatively thin intermediate wall 12, define the fluid duct D and the fluid pressure chamber C. Bolts or screws, one of which is indicated at 13, secure these several members together in fluid-tight relationship, suitable packing or gasket members 14 being employed to prevent leakage.

The inlet port of the fluid duct is indicated at 15, the outlet port at 16, and an intermedaite valve seat is indicated at 17, the port which is encircled by seat 17 being arranged for vertical flow of the fluid stream at this point and directly overlying a vertically extending access port formed in the casing wall and normally closed by a fluid-tight plug 18.

A combined valve and driven member of substantial mass is indicated at 20, this member carrying a gasket 21 which constitutes the actual valve seat engaging element. When member 20 is in the position in which it is shown in Figure 1 fluid may freely flow through duct D in the direction indicated by the arrows. It is normally maintained in this position, with its central upper protuberance 20a lightly pressed against the undersurface of the common wall member 12, by the "snap-over" spring 23 which is shown in plan in Figure 3.

This spring has an annular central portion 23a which encircles a cylindrical part 20b of the member 20 and which is clamped against an annular upwardly facing surface of that member by a clamping ring 24 which may be maintained in the position shown by peening over the edge of portion 20b of driven member 20. Integral with and radiating from the central portion 23a of the spring are a plurality of resilient spring leaves 23b, arranged in pairs of aligned and opposing leaves or blades, each blade 23b terminating outwardly in an end portion of slightly reduced width to provide each with two outwardly facing shoulders 23c. The outer edges of these spring leaves or blades are received within an annular groove 11a formed in the wall of the duct D, in which groove they are retained and in which they may rock slightly about their outer edges in the operation of the device.

The diameter of the circular upper portion of the duct D, taken at the bottom of annular groove 11a, is less than the diameter across the spring member 23, measured longitudinally of two aligned blades 23b and when these blades and the annular portion 23a are disposed in a common plane. The difference between these diameters is sufficiently great to cause the spring member to be considerably compressed diametrically when assembled in the casing. The degree of diametrical shortening of the spring is such that its central portion 23a may not remain in the plane of the groove 11a but must assume a position either above or below this plane, carrying the member 20 with it. Such a spring has no "neutral" position but must act to bring its central annulus into either a position well above the plane of the ends of its blades 23b, or a position well below this plane.

By similarly longitudinally and permanently curving the several blades before assembling the spring and casing, however, it is possible to give it a natural bias which will cause the central annulus 23a to occupy either a position only slightly above the groove 11a or a position well below this groove, and the blades 23b of the spring 23 shown are curved convexly downward with this end in view. As a result the member 20 will be only lightly pressed against the wall 12 when the spring is arched upwardly (Fig. 1), the distance between the plane of groove 11a and that of the undersurface of wall 12 being taken into account in the original shaping of the spring blades, and the gasket 21 will be more heavily pressed against seat 17, after the spring has passed through a neutral position, or position of maximum compression of blades 23b. By suitably curving the spring blades, keeping in mind the locations of the undersurface of the common wall 12 and the valve seat 17 it is possible to cause the spring center (and member 20 mounted thereon) to oppose a downward force only lightly, and for a short distance, while opposing an upwardly directed force more heavily and for a greater distance. In other words the possible upward thrust of the spring center from its unstable neutral position will be small in magnitude and short in distance while its downward thrust will be much stronger and exerted through a longer distance.

The snap-over spring 23 is so constructed that, as a result, closure of the valve may be brought about by application of a relatively light propelling force applied downwardly. The spring may be reset in upper position (Figure 1) by removing plug 18 and inserting a rod through the aperture thus created so that, after an undesirable condition which has resulted in valve closure has been rectified, the safety feature may again be placed in condition for operation.

The means for automatically bringing about valve closure is contained in the chamber C. This chamber has a movable wall portion which comprises a diaphragm 30 the margin of which is clamped against an annular shoulder of the chamber by a retaining ring 31 suitably held in position. Diaphragm 30 may be of any suitable flexible and fluid-tight material. It is centrally apertured for the reception of the cylindrical upper end of a central member 32 which performs several functions in the operation of the device. It constitutes means for securing the annular member 33 in the position shown, this member constituting a stiff backing plate for the central area of the diaphragm, as well as constituting a supporting hub for the spring members 23' and means for guiding the striking member 34 in its movements. The striking member 34 is cup shaped as shown having a cylindrical flange 34a, concave bottom 34b and tubular part 34c which is adapted to engage the common wall 12 when the striking member is projected downwardly by the spring.

The spring 23' is preferably identical with spring 23 previously described except in that its several radially extending leaves are initially longitudinally curved in a somewhat different manner for a purpose to be described. The reduced outer ends of the several blades are fitted loosely in apertures formed in the cylindrical portion 34a of the striking member, and the annular central portion of the spring encircles and is secured rigidly to member 32. The spindle-like downward extension 32b of member 32 guides the striker 34 in its vertical movements and likewise functions as a stop which limits downward movement of the diaphragm. Upward movement of the diaphragm is opposed by spring 36 located in a bore which communicates with the atmosphere through port 37. A port 38 constitutes an opening through which fluid under pressure, from any source, may enter the otherwise sealed chamber C.

So long as the pressure of the fluid in chamber C remains below a predetermined maximum the spring 23' and striking member 34 will occupy the positions in which they are shown in Figure 1, but if the permissible maximum pressure is exceeded the diaphragm with attached member 32, will be elevated until finally the central hub of the spring is lifted through the snap-over point, which is the point of maximum longitudinal compression and curvature of the individual spring leaves, whereupon the spring will instantly begin to expand and will thrust or propel the striking member 34 downwardly and the diaphragm upwardly. The stiff backing member 33 will be thrust against the surface 10a of the casing member 10 and the reduced lower end of the striker will strike the central portion of the relatively thin rigid wall 12 at a point just above the driven member 20. The impact delivered by striker 34 upon the wall 12 is strong enough to transfer sufficient momentum downwardly through the wall to activate member 20, which will then function to close the duct D as previously described. To effect this momentum transfer, an elastic impact is required, and the materials of striker 34, wall 12, driven member 20 should preferably be chosen such as to have a high coefficient of restitution, or if desired, the portions 34c, 20a, and the wall 12 at a place immediately between 34c and 20a can be provided with hard inserts (these having a high coefficient of restitution). By suitably curving the spring blades of spring 23' the spring may be caused to offer only a light resistance, through a relatively short distance, to upward movement of the diaphragm, to be followed by a relatively heavy downward thrust through a greater distance after the snap-over point has been passed, and such adjustment is preferred. The striker 34 is provided with apertures, such as 34d, to permit it to move rapidly through the fluid in chamber C. After operation on its working stroke, member 34 may be restored to its original position (Figure 1) with the aid of a suitable tool inserted through port 38 and will be again ready to descend when pressure changes in chamber C bring about upward travel of the diaphragm to a sufficient extent.

By providing two or more spring propelled striking members in tandem or series a relatively heavy thrust may be caused to be exerted upon the valve, to close the same and hold it in closed position, without requiring the pressure sensitive diaphragm to do more work. Such an arrangement is shown in Figures 4 and 5. Many of the parts shown in these views correspond in function to those appearing in Figures 1 and 2 and will not need to be described in great detail.

The casing is formed in three principal parts indicated at 50, 51 and 52, ports 53 and 54 being fluid inlet and outlet openings, respectively, for the duct D' and port 55 being the common fluid entry and outlet port for the chamber C'. The valve seat is indicated at 56, the valve member generally at V and the thin partition which is to be struck by the striker member 57 is indicated at 58, this partition separating the duct D' from the air containing chamber A directly above it and immediately below the chamber C.

The diaphragm 60, by means of the attached element 61, overcomes the action of leaf springs 62 when the pressure of fluid in chamber C rises unduly and depresses the striker 57. This striker is supported upon the spring means 64 illustrated in plan in Figure 7, the leaves 64a being initially longitudinally curved, as before, and united at their outer ends. This spring is of the snap-over type and is initially adjusted to reach the snap-over point upon the application of a relatively small force through a rather short distance and to thereafter deliver a substantial thrust through a greater distance. Downward movement of the diaphragm which carries the stiff plate 65 is limited by the transverse plate 66, and the downturned annular central flange 66a of this plate constitutes a stop limiting the upward movement of leaf springs 62. The stiffener plate 65 and the annular sloping surface 66b of member 66 together support the diaphragm, when in lowest position, so that it may not be ruptured by any sudden application of heavy pressure.

Within the duct D', and at the upper end thereof, there is located a driven member 67 mounted upon a snap-over spring means 68 of the type shown in Figure 8, the blades 68a of which are curved and under stress when assembled with the casing, as before. Impact of striker 57 upon wall or partition 58 causes a transfer of momentum through wall to driven element 67 so as to propel it downwardly, snap-over spring 68 then propelling it against the upper end of the stem V' of the valve V. Valve V is in turn mounted upon two snap-over springs 70 and 71, of identical construction (Figure 6), and the impact of member 67 upon the valve stem, together with continued force of spring 68 acting via 67, is sufficiently heavy to depress valve V and activate both of these springs, which are of heavier construction, and adapted to act more strongly, than spring 68. As a result, the valve V will be, in an entirely frictionlesss manner, thrust heavily against its seat 56 and fluid flow through the duct interrupted.

It will be observed that the valve stem has a central passage therethrough and this is closed by a smaller spring pressed valve 73 mounted upon an elongated spindle 74.

Valve 73 prevents leakage through the valve stem V' when valve V is in closed position but may be raised, with the spindle upon which it is mounted, when it is desired to reset driven member 67. This may be done by inserting a rod or tool into the lower end of the bore passing through the valve stem and pressing the spindle 74 upwardly to contact with member 67. Driven member 57 may be reset by inserting a tool through air vent aperture 51a formed in the main casing part 51. It will be observed that the upward movement of valve V is halted by stops 71a of spring means 71 which, while fabricated of resilient material are relatively short and substantially inflexible.

By means of the arrangement described a substantial degree of mechanical amplification may be realized. Additional striking means may be utilized if desired, with lighter springs activating progressively heavier ones, to realize greater ultimate propelling force. It will be obvious, likewise, that the elements of the mechanism may be rearranged where it is necessary to utilize the invention for special purposes.

Having thus described the invention, what is claimed as new and desired to be secured by Letters Patent is:

1. In a fluid flow control device of the class described, in combination, a duct for the transmission of a stream of fluid and having a valve seat therein, a chamber adjacent the duct and having a wall portion movable in response to variations in pressure of a fluid therein, said chamber and duct having a common fluid-tight deflectable wall, a striking member and a snap-over spring within the chamber, the spring engaging the striking member and urging it toward and into contact with, or away from, said common wall, means connecting the spring and movable portion of the wall of said chamber to cause the spring to move through its snap-over point when the movable wall portion has moved through a predetermined distance in response to change in fluid pressure within the chamber, to propel said striking member against said common wall, a driven member and a second snap-over spring positioned in said duct, the spring engaging the driven member and urging it either toward and into contact with, or away from, said common wall, and a valve associated with said driven member and arranged to seat upon said valve seat and close the duct after said driven member has moved the associated spring through its snap-over point while said driven member is moving away from said comomn wall after said common wall after said common wall having been struck a blow by said striking member.

2. In a fluid flow control device of the class described, in combination, a duct for the transmission of a stream of fluid and having a valve seat therein, a chamber adjacent the duct and having a wall portion movable in response to variations in pressure of a fluid therein, said chamber and duct having a common fluid-tight deflectable wall, a striking member in said chamber and movable toward and away from said common wall, a snap-over spring in said chamber, means connecting the spring to the movable portion of said chamber wall, another portion of said spring being connected to said striking member, said spring being adapted to urge said striking member toward and into contact with, or away from, said common wall, when moved through its snap-over point, a driven member and a second snap-over spring positioned in said duct, the spring engaging the driven member and urging it either toward and into contact with, or away from, said common wall, and a valve associated with said driven member and arranged to seat upon said valve seat and close the duct after said driven member has moved the associated spring through its snap-over point while said driven member is moving away from said common wall after said common wall having been struck a blow by said striking member.

3. In a fluid flow control device of the class described, in combination, a duct for the transmission of fluid, a chamber having a wall movable in response to variations in pressure of fluid contained therein, said chamber and duct having a common fluid-tight wall, mechanism within the chamber and in association with said pressure responsive movable wall for delivering a blow against said common wall when the fluid pressure in said chamber has varied from a predetermined pressure, and means wholly within the duct for closing the same immediately upon the delivery of such a blow against said common wall, said means including a driven member normally in contact with said common wall and adapted to be propelled on its operative stroke by said wall.

4. In a fluid flow control device of the class described, in combination, a duct for the transmission of fluid, a chamber having a wall movable in response to variations in pressure of fluid contained therein, said chamber and duct having a common fluid-tight wall, mechanism within the chamber and in association with said pressure responsive movable wall for delivering a blow against said common wall when the fluid pressure in said chamber has varied from a predetermined pressure, said mechanism including a driving member and a spring which initially resists movement of said driving member toward said common wall and thereafter forcibly propels said member against said wall, and means wholly within the duct for closing the same immediately upon the delivery of such a blow against said common wall, said means including a driven member normally in contact with said common wall and adapted to be propelled on its operative stroke by said wall.

5. In a fluid flow control device of the class described, in combination, a duct for the transmission of fluid, a chamber having a wall movable in response to variations in pressure of fluid contained therein, said chamber and duct having a common fluid-tight wall, mechanism within the chamber for delivering a blow against said common wall when the fluid pressure in said chamber has varied from a predetermined pressure, said mechanism including an element mounted on and movable with the movable wall of said chamber, a striking member movable toward and away from said common wall, and a spring interposed between said element and striking member and maintained under stress at all times by the coaction of said element and striking member, and means wholly within the duct for closing the same when said striking member delivers a blow against said common wall, said means including a driven member normally in contact with said common wall and adapted to be propelled on its operative stroke by said wall.

6. The combination set forth in claim 5 in which said element projects across the chamber and engages the said common wall after the movable wall of the chamber has advanced toward said common wall a predetermined distance, to thus limit the movement of said movable chamber wall.

7. The combination set forth in claim 5 in which said spring is rigidly secured to said element and is compressed between said element and said striking member.

8. The combination set forth in claim 5 in which said striking member encircles said element and is guided thereby in its movements toward and away from said common wall.

9. The combination set forth in claim 5 in which said striking member encircles said element and the spring includes a plurality of leaves radiating from said element, the outer ends of said leaves engaging said striking member, all such leaves being longitudinally compressed.

10. The combination set forth in claim 5 in which said striking member encircles said element and slides thereon in its reciprocatory movements, and the spring includes a plurality of blades rigidly secured to and radiating from said element, said blades being under longitudinal compression.

11. The combination set forth in claim 5 in which resilient means positioned exteriorly to said chamber yieldingly opposes outward movement of the chamber wall.

12. In a fluid flow control device of the class described, in combination, a duct for the transmission of fluid, a chamber having a wall movable in response to variations in pressure of fluid contained therein, said chamber and duct having a common fluid-tight wall, mechanism within the chamber for delivering a blow against said common wall when the fluid pressure in said chamber has varied from a predetermined pressure, said mechanism including an element mounted on and movable with the movable wall of said chamber, a striking member movable toward and away from said common wall, and a spring interposed between said element and striking member and maintained under stress at all times by the coaction of said element and striking member, and means wholly within the duct for closing the same when said striking member delivers a blow against said common wall, said means including a driven member and a second spring, the second spring being interposed between and engaging the said driven member and the wall of said duct and urging said driven member either toward and into contact with said common wall or in the opposite direction.

13. The combination set forth in claim 12 in which said second spring includes a plurality of spring blades rigidly secured to said driven member and radiating therefrom, the outer ends of said blades engaging the wall of the duct and the blades being longitudinally compressed at all times.

14. Means for applying a blow to the wall of a fluid duct, for the purpose set forth, said means including an element movable under the influence of applied fluid pressure, a driving member and a snap-over spring interposed between and connecting said member and element.

15. In a fluid flow control device of the type described, a duct for fluid under pressure, said duct having a valve seat formed therein, a valve disposed wholly in the duct, snap-over spring means supporting the valve in the duct for movement along a rectilinear path in one direction toward and into engagement with the valve seat and in the opposite direction to a predetermined unseated position, said spring means lightly opposing initial movement of the valve toward its seat and, after said valve has been advanced a predetermined distance, acting thereon to forcefully move it onto its seat and to maintain the same in seated position, a driven member movable along the same rectilinear path from a position in which it contacts the wall of the duct to a position in which it contacts the valve, a snap-over spring supporting the driven member for such movement, and means for striking the exterior wall of the duct directly over the said driven member to thereby cause the said member to strike the valve and initiate its movement toward the valve seat.

16. In a fluid flow control device of the type described, a duct for fluid under pressure, said duct having a valve seat formed therein, a valve disposed wholly in the duct, snap-over spring means supporting the valve in the duct for movement along a rectilinear path in one direction toward and into engagement with the valve seat and in the opposite direction to a predetermined unseated position, said spring means lightly opposing initial movement of the valve toward its seat and, after said valve has been advanced a predetermined distance, acting thereon to forcefully move it onto its seat and to maintain the same in seated position, said snap-over spring means including two series of spring blades spaced apart longitudinally of the path of travel of the valve, the blades of each series radiating from the valve and engaging the wall of the duct, a driven member movable along the same rectilinear path from a position in which it contacts the wall of the duct to a position in which it contacts the valve, a snap-over spring supporting the driven member upon the wall of the duct, and means for striking the exterior wall of the duct directly over said driven member to thereby cause the driven member to strike the valve and initiate its movement toward the valve seat.

17. In a fluid flow control device, in combination, a duct having a valve seat therein intermediate its ends, a valve in said duct and supported for movement toward and away from said seat, a driven member movable from a position in contact with the wall of the duct toward and into contact with said valve for the purpose of initiating closing movement of the valve, snap-over spring means supporting the driven member upon the wall of the duct, said spring means being adapted to lightly press the driven member against the wall of the duct and, after said driven member has receded from said wall and the spring has passed its snap-over point, to propel the driven member against the valve, and means associated with said valve for engaging and resetting the driven member in wall engaging position.

18. The combination set forth in claim 17 in which said last mentioned means includes a resetting rod slidably carried by the valve.

19. The combination set forth in claim 17 in which said valve has formed therein a tubular opening extending toward said driven member and said last mentioned means includes a resetting rod slidably housed within said opening and normally sealing said opening against the passage of fluid through the valve.

20. In a fluid flow control device, in combination, a chamber having a wall movable in response to variations in the pressure of fluid within the chamber, a striking member adjacent to said movable wall and without the chamber, a snap-over spring means for supporting the striking member in light contact with the movable wall and adapted to propel said member in a direction away from said wall after said member has been advanced by the wall through a predetermined position, and valve closing means adapted to be activated by a blow from said striking member.

21. The combination set forth in claim 20 in which the movable wall of the chamber comprises a diaphragm and means is provided for limiting the movement of the diaphragm and supporting the same against deformation at the end of a predetermined operative movement.

22. In combination, a chamber, a fluid duct, and a fluid-tight partition separating said chamber and said duct, said chamber having a wall movable in response to variations of pressure of fluid within the chamber, a striking member adapted to be released when the pressure on said movable wall reaches a predetermined value, said striking member then delivering an impact upon the fluid-tight partition separating said chamber from said fluid duct, a driven member in the duct movable as the result of momentum transfer thereto from said striker through said partition, and means within the duct for closing flow therethrough after momentum is thus imparted to said driven member.

23. The combination with a fluid duct of a duct closing means responsive to a blow against the wall of said duct from without, which means is wholly confined within said duct and isolated and normally inaccessible from without, said means including a driven member and a snap-over spring, said spring engaging said member and the wall of the duct and being adapted to urge said driven member in one direction toward and into contact with the wall of the duct and, after said member has been moved a predetermined distance in an opposite direction as a result of a blow applied exteriorly to the duct, to forcibly project said member in such opposite direction toward duct closing position at which the member remains until reset, said spring having openings therein to permit movement thereof irrespective of the existence of pressure in said duct.

24. The combination set forth in claim 23 in which said duct is provided with a valve seat and a valve member is associated with said driven member.

References Cited in the file of this patent

UNITED STATES PATENTS

| Number | Name | Date |
|---|---|---|
| 762,890 | Eaton et al. | June 21, 1904 |
| 1,480,942 | McKee | Jan. 15, 1924 |
| 1,580,277 | Bard | Apr. 13, 1926 |
| 1,719,687 | Browne | July 2, 1929 |
| 2,049,230 | Smith | July 28, 1936 |
| 2,070,421 | Chisholm | Feb. 9, 1937 |
| 2,336,647 | Spangenberg | Dec. 14, 1943 |
| 2,521,891 | Beams | Sept. 12, 1950 |
| 2,553,253 | Hays | May 15, 1951 |
| 2,625,437 | Huntington | Jan. 13, 1953 |
| 2,652,857 | Engstrum | Sept. 22, 1953 |
| 2,683,582 | Kerr | July 13, 1954 |